United States Patent
Kang et al.

(10) Patent No.: US 8,320,570 B2
(45) Date of Patent: Nov. 27, 2012

(54) APPARATUS AND METHOD FOR GENERATING SECRET KEY

(75) Inventors: You Sung Kang, Daejeon (KR); Doo Ho Choi, Cheonan-si (KR); Hyunsook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 396 days.

(21) Appl. No.: 12/631,323

(22) Filed: Dec. 4, 2009

(65) Prior Publication Data

US 2010/0142708 A1    Jun. 10, 2010

(30) Foreign Application Priority Data

Dec. 5, 2008  (KR) .......................... 10-2008-0123313
Mar. 16, 2009 (KR) .......................... 10-2009-0022305

(51) Int. Cl.
*H04K 1/00* (2006.01)
*H04L 9/08* (2006.01)
*H04Q 5/22* (2006.01)

(52) U.S. Cl. ...................... 380/278; 380/270; 340/10.51; 340/10.52

(58) Field of Classification Search ................ 340/10.51, 340/10.52; 380/270, 278
See application file for complete search history.

(56) References Cited

U.S. PATENT DOCUMENTS

| | | | |
|---|---|---|---|
| 6,839,434 B1 * | 1/2005 | Mizikovsky | 380/247 |
| 8,072,314 B1 * | 12/2011 | Kuzma et al. | 340/10.4 |
| 2004/0054900 A1 * | 3/2004 | He | 713/168 |
| 2004/0181681 A1 * | 9/2004 | Salisbury | 713/200 |
| 2006/0186200 A1 * | 8/2006 | Nochta | 235/382 |
| 2007/0069851 A1 * | 3/2007 | Sung et al. | 340/5.1 |
| 2007/0069852 A1 | 3/2007 | Mo et al. | |
| 2007/0120651 A1 * | 5/2007 | Kobayashi et al. | 340/10.51 |
| 2008/0094183 A1 * | 4/2008 | Fukushima et al. | 340/10.51 |
| 2008/0208753 A1 * | 8/2008 | Lee et al. | 705/51 |
| 2009/0169019 A1 * | 7/2009 | Bauchot et al. | 380/278 |

(Continued)

FOREIGN PATENT DOCUMENTS

JP   2008-186049   8/2008

(Continued)

OTHER PUBLICATIONS

ISO/IEC WD 29176, "Information technology—Automatic identification and data capture techniques—Mobile item identification and management—Consumer privacy-protection protocol for Mobile RFID services," retrieved online at http://www.iso.org/iso/iso_catalogue/catalogue_tc/catalogue_tc_browse.htm?commid=45332&development=on (Feb. 10, 2009).

(Continued)

*Primary Examiner* — Christian Laforgia
(74) *Attorney, Agent, or Firm* — Nelson Mullins Riley & Scarborough LLP; EuiHoon Lee, Esq.

(57) ABSTRACT

An apparatus for generating a secret key generates the secret key by using information of a mobile RFID terminal, transmits the generated secret key to an RFID tag attached on an article, and decrypts a unique item identifier of the article encrypted by using the generated secret key after receiving the unique item identifier of the article encrypted by using the secret key from the RFID tag. By this configuration, it is possible to protect user's personal privacy of the mobile RFID terminal in a state where user's intervention is minimized.

7 Claims, 3 Drawing Sheets

U.S. PATENT DOCUMENTS

| | | | |
|---|---|---|---|
| 2009/0214038 A1* | 8/2009 | Wong et al. | 380/270 |
| 2009/0262926 A1* | 10/2009 | Kabra et al. | 380/44 |
| 2009/0323928 A1* | 12/2009 | Kerschbaum et al. | 380/28 |
| 2010/0277287 A1* | 11/2010 | Choi et al. | 340/10.42 |
| 2011/0271105 A1* | 11/2011 | Shamir | 713/168 |

FOREIGN PATENT DOCUMENTS

| | | |
|---|---|---|
| KR | 1020040092669 | 11/2004 |
| KR | 1020070034425 | 3/2007 |
| KR | 1020070059946 | 6/2007 |
| KR | 1020090012386 | 2/2009 |
| WO | WO 2007/049072 A1 * | 3/2007 |

OTHER PUBLICATIONS

ISO/IEC WD 29176, "Information technology—Automatic identification and data capture techniques—Mobile item identification and management—Consumer privacy-protection protocol for Mobile RFID services," retrieved online at http://www.iso.org/iso/iso_catalogue/catalogue_tc/catalogue_tc_browse.htm?commid=45332&development=on (Aug. 1, 2009).

* cited by examiner

APPARATUS AND METHOD FOR GENERATING SECRET KEY

CROSS-REFERENCE TO RELATED APPLICATION

This application claims priority to and the benefit of Korean Patent Application Nos. 10-2008-0123313 and 10-2009-0022305 filed in the Korean Intellectual Property Office on Dec. 5, 2008 and Mar. 16, 2009, the entire contents of which are incorporated herein by reference.

BACKGROUND OF THE INVENTION (a) Field of the Invention

The present invention relates to an apparatus and a method for generating a secret key.

(b) Description of the Related Art

A mobile RFID terminal reads a unique item identifier (UII) of an RFID tag by incorporating and mounting an RFID reader in a portable terminal so as to provide various mobile RFID application services to a user. The portable terminal in which the RFID reader is incorporated or mounted is referred to as a mobile RFID terminal. The most general example of the mobile RFID environment includes the mobile RFID terminal and in an environment where the RFID tag is attached to a movie poster, when a user touches the mobile RFID terminal onto the RFID tag, the user can receive information on the corresponding movie through the mobile RFID terminal.

Another example of the mobile RFID environment may include an environment in which the RFID tag is attached to medicines prescribed by a doctor. In this case, the user who has the medicine prescribed by the doctor can receive information on the medicine and a dosage method by reading the RFID tag by using the mobile RFID terminal. However, when the user purchases an RFID-attached personal article such as the medicine, not an opened public article, a malicious attacker may arbitrarily read the UII of the article through an RFID tag of the article which the user purchases. At this time, since the read UII has a unique value according to a predetermined rule, the attacker can substantially determine an article type of the article purchased by the user and determine the position of the reader reading the RFID tag, thereby causing invasion of privacy in that a movement path of the user can be tracked.

As a result, protection of the personal privacy of the user who uses the mobile RFID terminal is necessarily required. For this, identification of the RFID tag attached to a personally owned article and acquisition of information need to be protected by using a secret key which only an article owner can utilizes. However, when a process of creating the secret key is complicated and user's intervention is required, utilization of a service using the mobile RFID terminal will be deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for generating a secret key capable of generating the secret key by minimizing user's intervention.

An exemplary embodiment of the present invention provides an apparatus for generating a secret key of a mobile radio frequency identification (RFID) terminal. The secret key generating apparatus includes an encryption unit, a communication unit, and a decryption unit. The encryption unit generates the secret key by using information of the mobile RFID terminal, the communication unit transmits the generated secret key to an RFID tag attached on an article, and receives a unique item identifier of the article encrypted by using the secret key from the RFID tag. In addition, the decryption unit provides information of the article to a user by decrypting the encrypted unique item identifier of the article by using the generated secret key.

Another embodiment of the present invention provides a method for generating a secret key in a mobile radio frequency identification (RFID) terminal. The secret key generating method includes: generating a secret key by using the information of the mobile RFID terminal; transmitting the generated secret key to an RFID tag attached on an article; receiving the encrypted unique item identifier of the article from the RFID tag by using the secret key; and providing the information of the article to a user by decrypting the encrypted unique item identifier by using the generated secret key.

According to an embodiment of the present invention, since a user does not need to memorize or manage a secret key for each RFID tag, it is possible to minimize user's intervention and support protection of personal privacy.

DETAILED DESCRIPTION OF THE EMBODIMENTS

Figure 1:
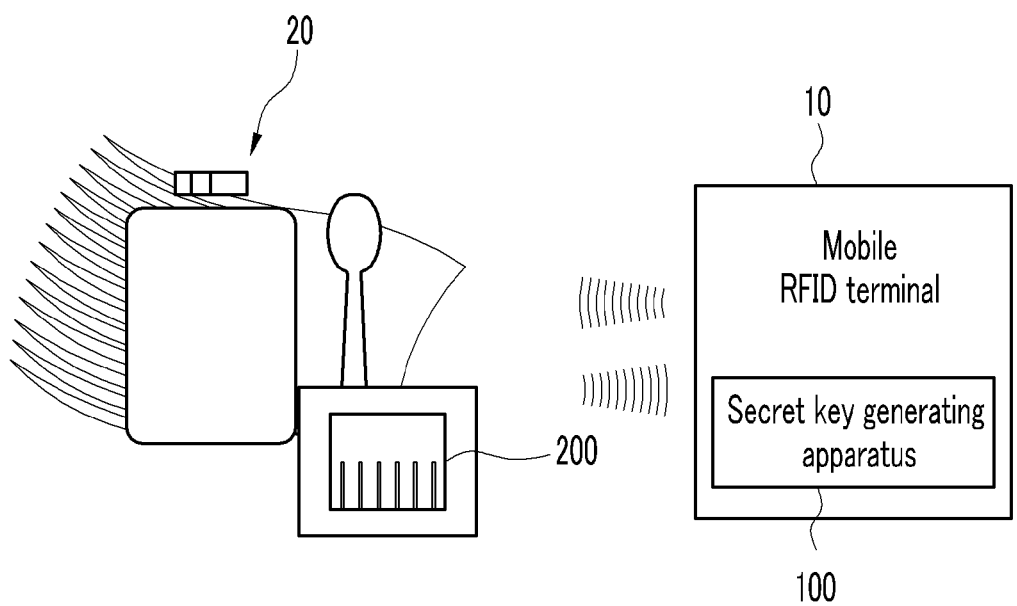
FIG. 1 is a schematic diagram illustrating a mobile RFID environment adopted in the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and the appended claims, unless explicitly described to the contrary, the word "comprise" and variations such as "comprises" or "comprising", will be understood to imply the inclusion of stated elements but not the exclusion of any other elements. In addition, the terms "-er", "-or", "module", and "block" described in the specification mean units for processing at least one function and operation, and can be implemented by hardware components or software components and combinations thereof.

Hereinafter, an apparatus and a method for generating a secret key according to an embodiment of the present invention will be described in detail with reference to the accompanying drawings.

FIG. 1 is a schematic diagram illustrating a mobile RFID environment adopted in the present invention.

Referring to FIG. 1, the mobile radio frequency identification (RFID) environment may be constituted by a portable terminal incorporated or mounted with an RFID reader, that is, an RFID terminal 10 and an article (i.e., medicine) 20 attached with an RFID tag 200. Therefore, when the RFID reader of the mobile RFID terminal 10 reads the RFID tag 200 attached to the article 20 which a user who uses the mobile RFID terminal 10 purchases, the RFID reader can read a unique item identifier (hereinafter, referred to as "UII") of the article 20 from the RFID tag 200. The UII as a unique value having a predetermined rule includes information on the corresponding article 20. Accordingly, the user of the mobile RFID terminal 10 can receive the information on the corresponding article 20 through the mobile RFID terminal 10. At this time, the mobile RFID terminal 10 according to the embodiment of the present invention includes a secret key generating apparatus 100 for protecting user's personal privacy.

Figure 2:
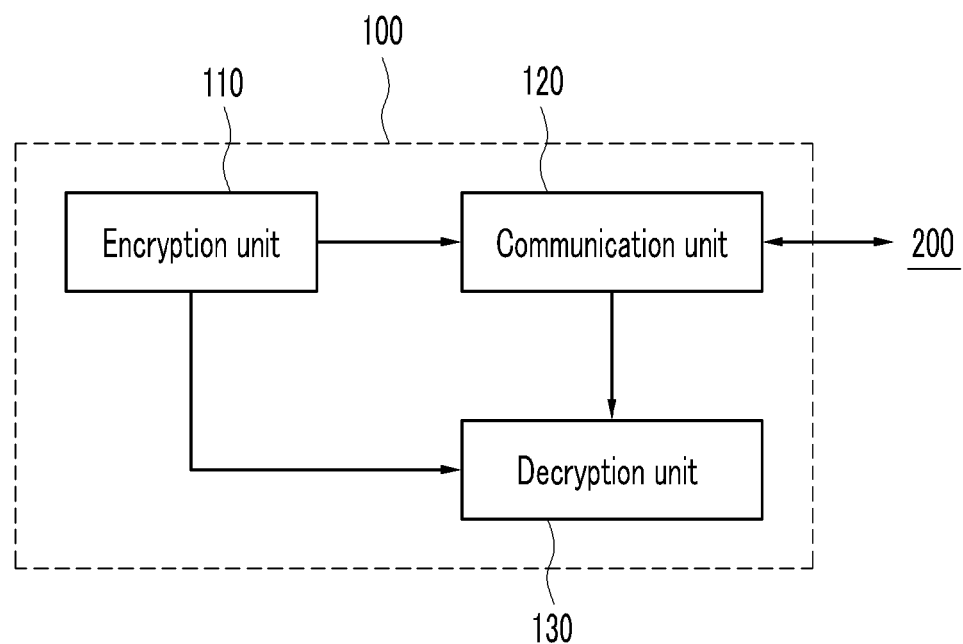
FIGS. 2 and 3 are diagrams illustrating an apparatus for generating a secret key according to first and second embodiment of the present invention, respectively.

FIG. 2 is a diagram illustrating an apparatus for generating a secret key according to a first embodiment of the present invention.

Referring to FIG. 2, the secret key generating apparatus 100 includes an encryption unit 110, a communication unit 120, and a decryption unit 130.

When the user puts the mobile RFID terminal 10 to the RFID tag, the encryption unit 110 generates the secret key by hashing the concatenated number after concatenating a phone number and an electronic serial number (ESN) of the mobile terminal RFID terminal 10. That is, if the phone number of the RFID terminal 10 is 010-0001-0001 and the electronic serial number of the mobile RFID terminal 10 is 80000000, a secret key of 32 bits is generated by hashing the concatenated number of 01000010001 and 80000000.

The communication unit 120 transmits the generated secret key to the RFID tag 200 and requests setting of the secret key to the RFID tag.

In this case, the RFID tag 200 receives the secret key transmitted through the communication unit 120 and encrypts the UII of the article 20 by using the received secret key and transmits the encrypted UII to the communication unit 120.

Further, the communication unit 120 transmits the UII encrypted by the RFID tag 200 to the decryption unit 130.

The decryption unit 130 decrypts the encrypted UII by using the generated secret key.

As such, when the secret key is generated by using the phone number and the electronic serial number of the mobile RFID terminal 10, the user does not need to especially memorize or manage the secret key.

Figure 3:
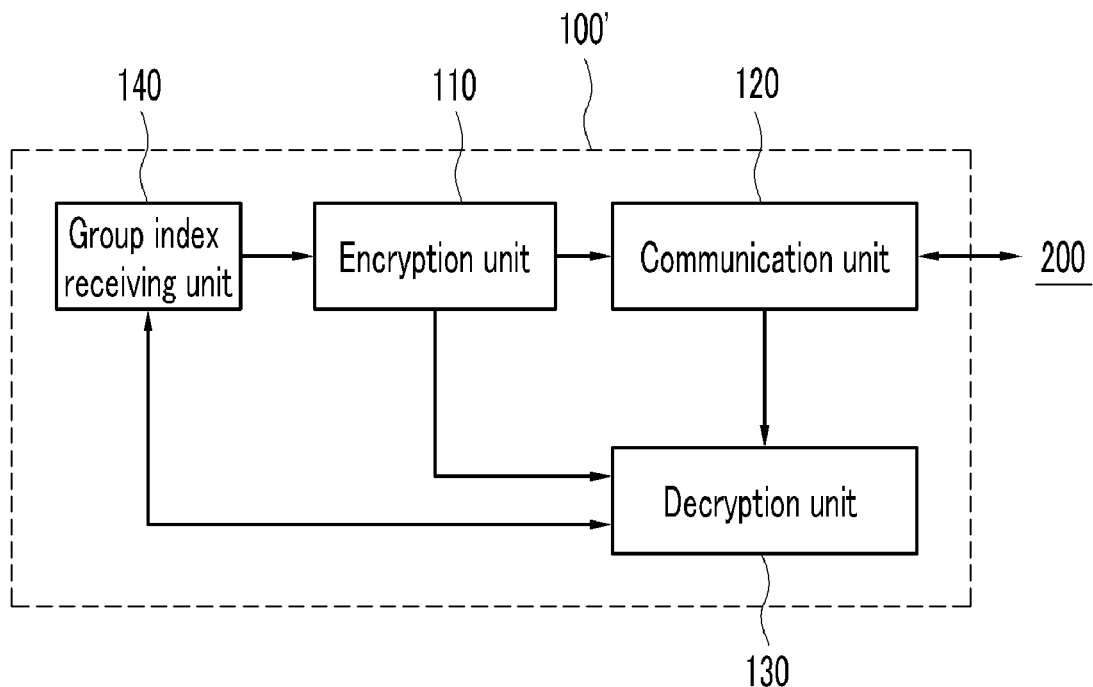

FIG. 3 is a diagram illustrating an apparatus for generating a secret key according to a second embodiment of the present invention.

Referring to FIG. 3, the secret key generating apparatus 100' has the same configuration as the secret key generating apparatus of the first embodiment except for further including a group index receiving unit 140.

The group index receiving unit 140 requests group index information to the user and receives the group index information from the user.

In this case, the encryption unit 110 generates the secret key by hashing the concatenated number after concatenating the phone number and the electronic serial number of the mobile RFID terminal 10 and the received group index information. At this time, the group index information as information such as a number, a text, etc. which the user can directly select may be used as a password at the time of decrypting the UII of the article 20.

That is, when the RFID tag encrypts the UII by using the secret key generated by using the group index information, the decryption unit 130 requests and receives the group index information through the group index receiving unit 140 before decrypting the UII received from the RFID tag 200, compares the group index information used to generate the secret key with the received group index information, and when they coincide with each other, decrypts the unique item identification by using the corresponding secret key.

Figure 4:
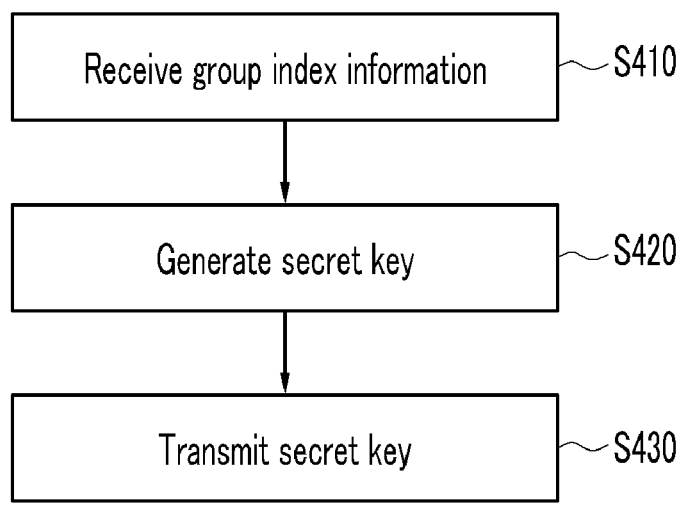
FIG. 4 is a flowchart illustrating a method for generating a secret key of a mobile RFID terminal according to an embodiment of the present invention.

FIG. 4 is a diagram illustrating a method for generating a secret key of a secret key generating apparatus according to an embodiment of the present invention.

Referring to FIG. 4, the secret key generating apparatus 100 of a mobile RFID terminal 10 generates the secret key by hashing the concatenated number after concatenating a phone number and an electronic serial number of a mobile RFID terminal 10 (S410). Meanwhile, the secret key generating apparatus 100 may generate the secret key by hashing the concatenated number after concatenating the phone number and the electronic serial number of the mobile RFID terminal 10 and group index information. In this case, the secret key generating apparatus 100 receives the group index information which a user sets from the user (S410).

Thereafter, the secret key generating apparatus 100 transmits the generated secret key to an RFID tag 200 (S430).

Figure 5:
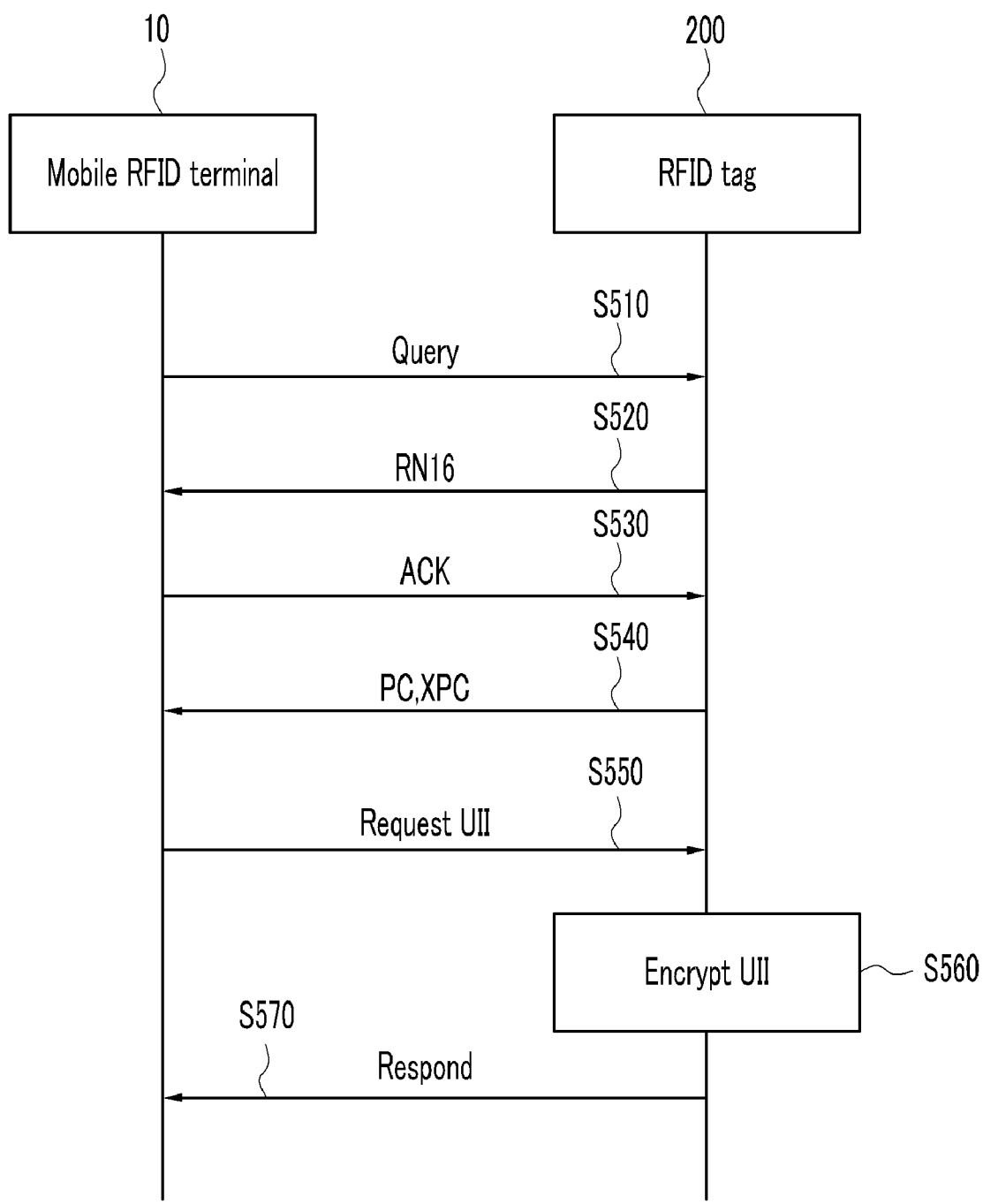
FIG. 5 is a diagram illustrating a UII encryption method of an RFID tag using a secret key generated by an apparatus for generating the secret key according to an embodiment of the present invention.

FIG. 5 is a flowchart illustrating a UII encryption method of an RFID tag using a secret key generated by an apparatus for generating the secret key according to an embodiment of the present invention.

Referring to FIG. 5, the mobile RFID terminal 10 transmits a query to the RFID tag 200 to request an event (S510).

The RFID tag 200 responds with a random number of 16 bits (RN16) in respects to the event request (S520).

When the response (RN16) in respects to the event request is received from the RFID tag 200, the mobile RFID terminal 10 transmits the resultant response (ACK) to the RFID tag 200 (S530). At this time, the random number of 16 bits is utilized as a temporary ID of the RFID tag 200. That is, a plurality of RFID tags 200 may exist in the vicinity of the mobile RFID terminal 10. However, there is no method which can discriminate the corresponding RFID tag 200 before the UII is known. Therefore, the mobile RFID terminal 10 receives the random number of 16 bits (RN16) from the RFID tag 200 and sets the random number of 16 bits (RN16) as the temporary ID of the corresponding RFID tag 200. In addition, the mobile RFID terminal 10 always includes the random number of 16 bits (RN16) in all commands transmitted thereafter and transmits them. As a result, only the RFID tag 200 which responds with the corresponding number of 16 bits (RN16) receives the corresponding command.

Subsequently, the RFID tag 200 responds a protocol control (PC) and an extended protocol control (XPC) (S540). At this time, the PC and the XPC indicate information on an ability which the RFID tag 200 itself can support. For example, the PC and the XPC may include the size of the UII and information on the existence or nonexistence of a memory area.

Thereafter, the mobile RFID terminal 10 requests the UII to the RFID tag 200 (S550).

The RFID tag 200 encrypts the UII by using the received secret key (S560) and responds to the UII request by transmitting the encrypted UII to the secret key generating apparatus 100 (S570).

As described above, the secret key generating apparatus 100 of the mobile RFID terminal 10 according to the embodiment of the present invention provides information on the corresponding article to the user by decrypting the encrypted UII by using the generated secret key.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for generating a secret key in a mobile radio frequency identification (RFID) terminal, comprising:
    a computer hardware processor;
    an encryption unit, operable by the processor, generating the secret key by using information of the mobile RFID terminal;
    a communication unit transmitting the generated secret key to an RFID tag attached on an article and receiving a unique item identifier encrypted by using the secret key from the RFID tag;
    a decryption unit providing information of the article by decrypting the encrypted unique item identifier of the article by using the generated secret key: and
    a group index receiving unit receiving group index information operating as a password at the time of decrypting the unique item identifier of the article from a user,
    wherein the encryption unit generates the secret key by additionally using the group index information.

2. The apparatus of claim 1, wherein:
    the information of the mobile RFID terminal includes a phone number and an electronic serial number of the mobile RFID terminal, and
    the encryption unit generates the secret key by hashing the concatenated number after concatenating the phone number and the electronic serial number.

3. The apparatus of claim 1, wherein:
    the information of the mobile RFID terminal includes the phone number and the electronic serial number of the mobile RFID terminal,
    wherein the encryption unit generates the secret key by hashing the concatenated number after concatenating the phone number and the electronic serial number and the group index information.

4. The apparatus of claim 1, wherein the unique item identifier comprises a unique value of the article having a predetermined rule that includes information on the corresponding article.

5. A method for generating a secret key in a mobile radio frequency identification (RFID) terminal, comprising:
    generating, by a computer, a secret key by using the information of the mobile RFID terminal;
    transmitting the generated secret key to an RFID tag attached on an article;
    receiving the encrypted unique item identifier of the article from the RFID tag by using the secret key;
    providing the information of the article to a user by decrypting the encrypted unique item identifier by using the generated secret key; and
    receiving first group index information from the user, the first group index information operating as a password at the time of decrypting the unique item identifier of the article from a user,
    wherein the secret key is generated by additionally using the first group index information in addition to the information of the mobile RFID terminal.

6. The method of claim 5, wherein:
    the information of the mobile RFID terminal at least includes a phone number and an electronic serial number of the mobile RFID terminal,
    the generating step includes,
    concatenating the phone number and the electronic serial number of the mobile RFID terminal; and
    hashing the concatenated number of the phone number and the electronic serial number.

7. A system for generating a secret key in a mobile radio frequency identification (RFID) terminal, comprising:
    a computer hardware processor;
    an encryption unit, operable by the processor, generating the secret key by using information of the mobile RFID terminal;
    a communication unit transmitting the generated secret key to an RFID tag attached on an article and receiving a unique item identifier encrypted by using the secret key from the RFID tag, wherein the unique item identifier comprises a unique value of the article having a predetermined rule that includes information on the corresponding article;
    a decryption unit providing information of the article by decrypting the encrypted unique item identifier of the article by using the generated secret key; and
    a group index receiving unit receiving group index information operating as a password at the time of decrypting the unique item identifier of the article from a user,
    wherein the encryption unit generates the secret key by additionally using the group index information.

* * * * *